United States Patent [19]

Puhl et al.

[11] 4,390,963
[45] Jun. 28, 1983

[54] INTERFACE ADAPTER ARCHITECTURE
[75] Inventors: Larry C. Puhl, Sleepy Hollow; Paul A. Kasley, Melrose Park, both of Ill.
[73] Assignee: Motorola, Inc., Schaumburg, Ill.
[21] Appl. No.: 187,306
[22] Filed: Sep. 15, 1980
[51] Int. Cl.³ .......................... G06F 3/04; G06F 3/00
[52] U.S. Cl. .................................. 364/900; 364/200
[58] Field of Search ... 364/200 MS File, 900 MS File
[56] References Cited

U.S. PATENT DOCUMENTS

| | | | |
|---|---|---|---|
| D. 234,605 | 3/1975 | Larson | D26/14 K |
| 3,458,664 | 7/1969 | Adlhoch et al. | 179/41 |
| 3,571,519 | 3/1971 | Tsimbidis | 179/41 |
| 3,701,105 | 10/1972 | Finnegan et al. | 340/172.5 |
| 3,766,524 | 10/1973 | Maring et al. | 340/172.5 |
| 3,806,663 | 4/1974 | Peek et al. | 179/41 A |
| 3,906,166 | 9/1975 | Cooper et al. | 179/41 A |
| 3,962,553 | 6/1976 | Linder et al. | 179/41 A |
| 3,972,024 | 7/1976 | Schroeder et al. | 340/172.5 |
| 3,979,730 | 9/1976 | Bennett et al. | 364/200 |
| 3,979,732 | 9/1976 | Hepworth et al. | 364/200 |
| 4,003,028 | 1/1977 | Bennett et al. | 340/172.5 |
| 4,004,283 | 1/1977 | Bennett et al. | 340/172.5 |
| 4,010,448 | 3/1977 | Bennett et al. | 340/172.5 |
| 4,025,853 | 5/1977 | Addeo | 325/55 |
| 4,029,900 | 6/1977 | Addeo | 178/69.1 |
| 4,030,079 | 6/1977 | Bennett et al. | 364/200 |
| 4,032,896 | 6/1977 | Bennett et al. | 364/200 |
| 4,037,204 | 6/1977 | Bennett et al. | 364/200 |
| 4,040,035 | 8/1977 | Bennett et al. | 364/200 |
| 4,052,702 | 10/1977 | Smith et al. | 364/200 |
| 4,069,510 | 1/1978 | Carlow et al. | 364/200 |
| 4,075,688 | 2/1978 | Lynch, Jr. et al. | 364/200 |
| 4,079,455 | 3/1978 | Ozga | 364/200 |
| 4,086,627 | 4/1978 | Bennett et al. | 364/200 |
| 4,087,855 | 5/1978 | Bennett et al. | 364/200 |
| 4,093,982 | 6/1978 | Heuer et al. | 364/200 |
| 4,093,983 | 6/1978 | Masog et al. | 364/200 |
| 4,107,781 | 8/1978 | Barrett et al. | 364/200 |
| 4,118,776 | 10/1978 | Isomura | 364/474 |
| 4,122,304 | 10/1978 | Mallien | 179/2 EB |
| 4,144,411 | 3/1979 | Frenkiel | 179/2 EB |
| 4,153,933 | 5/1979 | Blume, Jr. et al. | 364/200 |
| 4,156,910 | 5/1979 | Barton et al. | 364/200 |
| 4,200,936 | 4/1980 | Borzcik et al. | 364/900 |
| 4,220,820 | 9/1980 | Mallien | 179/2 EB |
| 4,222,116 | 9/1980 | Groves | 364/900 |
| 4,241,398 | 12/1980 | Carll | 364/200 |
| 4,271,518 | 6/1981 | Birzele et al. | 364/200 |

OTHER PUBLICATIONS

Proceedings of 30th Annual Conference of the IEEE Vehicular Technology Society, International Conference on Transportation Electronics, Sep. 15-17, 1980, Dearborn, MI., Bohn Printing Co., Utica, MI.
Portable Telephones for Cellular Systems, Leitich et al., Motorola, Inc., Sep. 15, 1980, (80CH1601-Copyright) Vehicular Technology Society, IEEE.
Portable Telephones for 850 $MH_z$ Cellular Systems, Fisher et al., Bell Laboratories, Whippany, N. J., Sep. 15, 1980, (80CH1601-4-Copyright), Vehicular Technology Society, IEEE.

Primary Examiner—Joseph F. Ruggiero
Assistant Examiner—Gary V. Harkcom
Attorney, Agent, or Firm—Rolland R. Hackbart; James W. Gillman

[57] ABSTRACT

A unique interface adapter is described which includes circuitry for recovering a clock signal and a non-return-to-zero (NRZ) data signal from a data signal transmitted on two forward data signals. The NRZ data signal is shifted into a receiving register, where address circuitry decodes the address portion of the data signal to provide a chip select signal and control circuitry decodes the control portion of the data signal to provide a register select signal, read/write signal and bus sense signal. The register select signal determines whether an output register or a data direction register is to be loaded in response to the read/write signal with the data portion of the data signal. The binary states of the data direction register determine which ones of the interface signals are to be output signals, and enable corresponding output register signals to be applied to the interface signals by way of transmission gates. While a data signal is being received on the forward data signals, the interface signals are loaded into a transmitting register and, in response to the chip select signal and clock signal, serially applied to a return data signal. The unique interface adapter may be advantageously utilized in any application where it is necessary to remotely control a plurality of interface lines with a minimum number of signal lines.

8 Claims, 5 Drawing Figures

INTERFACE ADAPTER ARCHITECTURE

RELATED PATENT APPLICATIONS

The instant application is related to the following patent applications filed the same date as and assigned to the same assignee as the instant application: Ser. No. 187,304, by Larry C. Puhl et al., entitled "Microprocessor Controlled Radiotelephone Transceiver"; Ser. No. 187,302, by Larry C. Puhl, entitled "Communications Microprocessor Architecture"; Ser. No. 187,305, by Larry C. Puhl et al., entitled "Keyboard and Display Interface Adapter Architecture"; Ser. No. 187,303, by John P. Byrns, entitled "Self-Clocking Data Transmission System and Method Therefor". The instant application is also related to U.S. patent applications, Ser. No. 119,605, now U.S. Pat. No. 4,312,074 by Kenneth A. Felix and James A. Pautler, entitled "Improved Method and Appartus for Detecting a Data Signal Including Repeated Data Words", and Ser. No. 119,350, now U.S. Pat. No. 4,302,845, by John P. Byrns and Michael J. McClaughry, entitled "Phase-Encoded Data Signal Demodulator", both of which were filed on Feb. 7, 1980, and are assigned to the instant assignee. By reference thereto, the foregoing related patent applications are incorporated in their entirety into the instant application.

BACKGROUND OF THE INVENTION

The present invention is related generally to signal interface circuitry, and more particularly to interface circuitry for coupling interface signals to a serial data bus in a microprocessor controlled radio transceiver.

In prior art radio control units, as exemplified by those in U.S. Pat. Nos. 3,458,664 and 3,571,519, interface signals from a radio have been accommodated by direction connection to dedicated circuitry of the control unit. However, the need for more sophisticated radio control units has resulted in the use of microprocessors for controlling the operation of the radio, as in U.S. Pat. No. 4,122,304. The radio control signals formerly connected directly to dedicated circuitry of the radio control unit now must be coupled by appropriate interface circuitry to a microprocessor. Commercially available microprocessors, such as the Motorola type MC6800 microprocessor described in U.S. Pat. No. 4,030,079, have associated interface adapters, such as the Motorola type MC6821 interface adapter described in U.S. Pat. No. 3,979,730, for accommodating a number of interface signals. These interface adapters are interconnected to the microprocessor by connection to its internal parallel address and data buses. Because the connection to the address and data buses is made in parallel, a large number of interconnections are required. In addition, clock and timing signals must also be connected to such interface adapters for proper operation. Separate clock and timing signals render the reception of data signals by these interface adapters highly susceptible to falsing due to speed and timing variations. The number of external interconnections can be reduced somewhat by utilizing microprocessors, such as the Motorola MC6801, which include interface circuitry on the same integrated circuit as the microprocessor. However, such single chip microprocessors are severely limited in the number of direct connections that can be made to interface signals and must use conventional interface adapters to accommodate additional interface signals. None of these prior art microprocessor systems accommodate a large number of interface signals while also having relatively few interconnecting signals between the microprocessor and the interface adapters.

SUMMARY OF THE INVENTION

Accordingly, it is an object of the present invention to provide an improved interface adapter that receives data signals from a self-clocking serial data bus for application to a plurality of interface signals.

It is another object of the present invention to provide an improved interface adapter for receiving data signals from a bidirectional self-clocking serial data bus for application to interface signals, while at the same time applying sampled interface signals to a return data signal line of the serial data bus.

It is yet another object of the present invention to provide an improved interface adapter that receives a data signal from a self-clocking serial data bus having two forward data signal lines, where each data signal includes an address portion for uniquely addressing the interface adapter and a data portion for application to interface signals.

In practicing the present invention, an interface adapter receives a binary data signal including address, control and data portions from a self-clocking serial data bus for application to interface signals. The serial data bus includes two forward data signal lines together having first, second, third and fourth two-bit binary states, where the first binary state is provided before and after a data signal, the second binary state is provided for data signal bits having a binary one state, the fourth binary state is provided for data signal bits have a binary zero state and the third binary state is provided between successive data signal bits. The interface adapter includes circuitry responsive to the third binary state of the signal lines for providing a clock signal, and latch circuitry responsive to the second and fourth binary states of the signal lines for providing a non-return-to-zero output signal. The latch output signal is serially shifted into a receiving register in response to the clock signal. Address detecting circuitry is responsive to the address portion of the data signal in receiving register for detecting a predetermined address signal and providing a chip select signal when the predetermined address signal is detected. Control circuitry is responsive to the chip select signal and the control signal portion of the data signal in the receiving register for providing first and second control signals. An output register is loaded with the data portion of the data signal in the receiving register in response to the first control signal, and a data direction register is loaded with the data portion of the data signal in the receiving register in response to the second control signal. Other circuitry applies the output data register signals to corresponding interface signals in response to a predetermined binary state of corresponding data direction register signals. Thus, the interface signals may be either input signals or output signals depending on the binary state of the signals loaded into the data direction register.

The serial data bus may also include a return data signal line on which the interface adapter may transmit data signals representative of the binary state of the interface signals. Thus, the binary state of those signals selected to be input signals may be ascertained. A transmitting register is loaded with the sampled state of the interface signals and, in response to the chip select signal and clock signal, successively, shifted for applying the sampled interface signals to the return data signal line.

BRIEF DESCRIPTION OF THE DRAWINGS

FIG. 1 is a block diagram of a radiotelephone that may advantageously utilize interface adapters embodying the present invention.

DETAILED DESCRIPTION OF THE PREFERRED EMBODIMENT

Referring to FIG. 1, there is illustrated a block diagram of a radiotelephone 100 suitable for use in cellular radiotelephone systems of the type described in U.S. Pat. No. 3,906,166 and in a developmental cellular system application, filed by Motorola and American Radio-Telephone Service, Inc. under Docket No. 18262 with the Federal Communications Commission in February, 1977. The radiotelephone 100 provides the same type of fully automatic telephone service to a mobile or portable operator that is provided to land line subscribers. Radiotelephone service is provided over a wide geographical area by dividing the area into a number of cells. Each cell typically has a base station which provides a supervisory signalling radio channel and a number of voice radio channels. Calls are placed to, and originated by, radio-telephones over the supervisory signalling channel in each of the cells. Upon completion of the supervisory signalling, the radiotelephone is assigned a voice channel and switches from the signalling channel to the voice channel for the duration of the call. In the event that a radiotelephone leaves a cell and enters another cell, the radiotelephone is automatically switched over, or handed off, to an available voice channel in the new cell. The supervisory signals carried on the signalling channel, and on voice channels for handing off a radio-telephone as it changes cells, is provided by digital signals encoded in a suitable format, such as Manchester Coding, and transmitted at a relatively high speed, such as 10 kHz. The format and transmission of the digital signals is described in more detail in the aforementioned co-pending applications Ser. Nos. 119,605 and 119,350.

In order to accommodate the high speed supervisory signalling in such cellular radiotelephone systems, the radiotelephone 100 includes a microprocessor 101 together with peripheral devices 102–112, a synthesized radio unit 120, serial number and telephone number memories 130 and 131, a telephone number display 140, a keyboard 150 and status indicating LED's 160. Microprocessor 101 (described in further detail in co-pending application No. 187,302) is responsive to a control program stored in read-only memory (ROM) 103 for receiving data signals from the radio unit 120 by way of synchronization unit 106 (described in further detail in co-pending application Ser. No. 119,350) and data interface unit 105 (described in further detail in co-pending application No. 187,302) for storage in random access memory (RAM) 104, and transmitting to radio unit 120 supervisory data signals stored in RAM 104 by way of data interface unit 105.

Microprocessor 101 is also coupled to radio unit 120 directly by four control signals 114, one for powering up the radio unit, two for controlling the frequency synthesizer and one for sensing audio signals applied to microphone 122, and also by way of a unique self-clocking serial data bus 113 and interface adapters 107–109, embodying the present invention. Microprocessor 101 is coupled to interface adapters 107–109 by self-clocking serial data bus 113, which includes two forward data signal lines and a reverse data signal line (described in further detail in co-pending application Ser. No. 187,503). Data signals applied to the forward data signal lines are received by interface adapters 107–109 and applied to radio unit 120. Interface adapter 107 provides audio control signals to the receiver of radio unit 120 for selecting one of two received audio signals if the radio unit includes two antennas 121 for space diversity purposes, controlling the volume of the received audio signal applied to speaker 123, and muting the received audio signal to provide a conventional squelch type function. Interface adapter 108 provides audio control signals to the transmitter of radio unit 120 for controlling the volume of the transmitted audio signal, muting of the transmitted audio signal and powering up the transmitting circuitry. Interface adapter 109 applies an eight-bit frequency control signal to a frequency synthesizer (not shown) in radio unit 120 for determining the transmitting and receiving frequencies thereof. The frequency control signal applied to the frequency synthesizer in radio unit 120 can be expanded to up to sixteen bits by utilizing two direct control signals 114 from the microprocessor 101 to selectively apply either eight high order bits or eight low order bits to the frequency synthesizer. Radio unit 120 can be any conventional radio unit suitable for cellular system operation, such as the radio described in Motorola Instruction Manual 68P81039E25, published by Motorola Service Publications, Schaumburg, Ill., 1979. The radiotelephone described in the aforementioned instruction manual is a frequency synthesized radio specially adapted for use in cellular radiotelephone systems.

Microprocessor 101 is also coupled by way of the serial data bus 113 to interface adapters 110 and 111 for accessing a serial number and telephone number assigned to the radiotelephone 100. The serial number and telephone number of the radiotelephone 100 are stored in separate memories 130 and 131, respectively, so that each may be changed simply by replacing one memory with another. The serial number and telephone number may include a plurality of binary-code-decimal digits stored in successive locations of these memories. In order to access each digit of the serial number or telephone number, the microprocessor 101 transits an address data signal by way of the serial data bus 113 to interface adapter 110. The address signal received by interface adapter 110 is applied to the serial number memory 130 and telephone number memory 131. The applied address signal includes one bit for selecting between the serial number memory 130 and telephone number memory 131 and five bits for selecting the particular digit of the serial number or telephone number to be read out. The digit of the serial number or telephone number read out from the addressed serial number memory 130 or telephone number memory 131 is applied to interface adapter 111 which couples the readout digit to the serial data bus 113 for transmission back to the microprocessor 101.

Microprocessor 101 is also coupled by way of the serial data bus 113 to a unique keyboard and display interface adapter 112 (described in further detail in co-pending application Ser. No. 187,305). The keyboard and display interface adapter 112 provides for the display of eight digits of an entered telephone number in display 140, scans the keyboard 150 for activated keys and activates status indicating LED's 160, one indicating that the radiotelephone is in the roam mode, another that the radiotelephone is in use, another that no service is available to the radiotelephone and the last that the radiotelephone is locked preventing unauthorized use. The keyboard and display interface adapter 112 scans the keys of the keyboard 150, monitors off-hook switch 170, and applies a data signal to the serial data bus 113 indicating which keys are found to be activated and whether the off-hook switch 170 is activated or not. The keyboard and display interface adapter 112 also receives data signals transmitted by the microprocessor 101 on the serial data bus 113 for display in the telephone number display 140 or for activating one of the four status LED's 160.

The radio unit 120 of the radiotelephone 100 may be either a mobile unit as described in the aforementioned Motorola Instruction Manual 68P81039E25 or a hand-held portable unit of the type described in U.S. Pat. Nos. 3,906,166 and 3,962,553, having an external appearance as illustrated in U.S. Pat. No. D234,605. The microprocessor 101 and associated peripheral devices 103-112 are of the type that may readily be integrated into a semicondutive substrate, such as CMOS, and provided individually or together on an integrated circuit. The microprocessor 101 and related peripheral devices 103-112 have been architectured such that the high priority supervisory signals received and transmitted by radio unit 120 are handled on a high speed interrupt basis by data interface unit 105 and synchronization unit 106, while the lower priority control signals for the radio unit 120, display unit 140, keyboard 150 and status LED's 160 are handled on a lower speed basis by way of the serial data bus 113 and interface adapters 107-112. Since the serial data bus 113 is self-clocking and independent of the speed of transmission, interface adapters 107-112 can be physically located remote from microprocessor 101 without any degradation in performance. Thus, interface adapters 107-109 may be located in the radio unit, if desired, and the keyboard and display interface adapter 112 may be located on the same printed circuit board as the telephone number display 140 and keyboard 150, both being physically separated from the printed circuit board on which microprocessor 101 is located. Further details as to the exact description and construction of the transmitting and receiving circuitry in a typical radio unit 120 can be found in the aforementioned Motorola Instruction Manual 68P81039E25.

Figure 2:
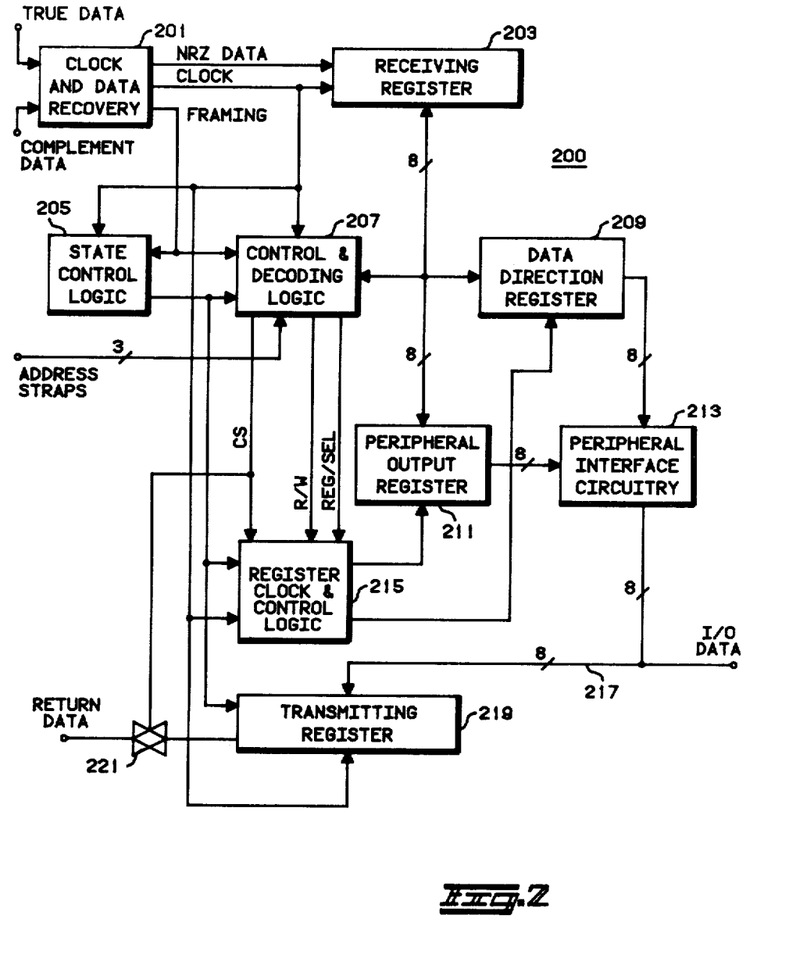
FIG. 2 is a functional block diagram of an interface adapter embodying the present invention.

Referring to FIG. 2, there is illustrated an interface adapter 20 embodying the present invention. The interface adapter 200 is coupled to eight interface signals 217 which may be selected to be either input or output signals under program control. Sixteen-bit data signals including address, control and data portions, are transmitted on the serial data bus 113 by microprocessor 101 in FIG. 1 to one or more interface adapters 200 in a self-clocking format on two forward data signal lines, which are designated the true data and complement data signal lines. The data transmission format, described in further detail in co-pending application Ser. No. 187,303, makes use of the four possible two-bit binary states of the true data and complement data signal lines in order to encode the binary state of each bit, a clock signal and framing information. The two-bit binary states assigned to the true data and complement data signal lines for each of the four possible states is illustrated hereinbelow in Table I. It is to be understood that these binary states can be reassigned many different ways in accordance with the teachings of co-pending application Ser. No. 187,303.

TABLE I

| TRUE DATA | COMPLEMENT DATA | TWO-BIT STATE |
|---|---|---|
| 0 | 0 | Word State |
| 0 | 1 | Zero State |
| 1 | 0 | One State |
| 1 | 1 | Bit State |

Referring to Table I, the word state is provided before and after the sixteen-bit data signal, the zero state is provided for each binary zero bit of the data signal, the one state is provided for each binary one bit of the data signal and the bit state is provided between successive data signal bits. Successive data signals may be transmitted one after another as long as the word state of the true data and complement data signal lines is provided between them. A typical data signal coded according to this format is illustrated by the waveforms in FIG. 4.

The true data and complement data signal lines are coupled to clock and data recovery circuitry 201 which recovers a non-return-to-zero (NRZ) data signal, a clock signal and a framing signal. The NRZ data signal is loaded into an eight-bit receiving register 203 in response to the clock signal. The sixteen-bit data signal is divided into an address and control portion, including bits 1-8, and a data portion, including bits 9-16, as illustrated in Table II hereinbelow. Thus, the first eight bits shifted into receiving register 203 are the address and control portion of the data signal. For the waveforms shown in FIG. 4, the transmitted data signal includes address and control portion 01011010 and data portion 00001111.

TABLE II

| DATA BIT | FUNCTION | DESCRIPTION |
|---|---|---|
| 1 | Register Select | 1 selects OR<br>0 selects DDR |
| 2-6 | Address | Bits 2-4 = Unit Address<br>Bit 5 = 1<br>Bit 6 = 0 |
| 7 | Bus Sense | 1 for true<br>0 for complement |
| 8 | Read/Write | 1 for Read<br>0 for Write |
| 9-16 | Data | DDR; 1 for outputs,<br>0 for inputs<br>OR; output data |

In response to the recovered clock signal from the clock and data recovery circuitry 201, the state control logic 205 provides fifteen control states for identifying the bits of the received data signal. The control and decoding logic 207 decodes the address portion of the data signal loaded into receiving register 203 and provides a chip select signal to register clock and control logic 215. The control and decoding logic 207 also is responsive to selected control states from the state control logic 205 for providing a read/write control signal, a register select control signal and a bus sense control signal to the register clock and control logic 215. The register clock and control logic 215 enables either the peripheral output register 211 or the data direction register 209 in response to the register select signal and framing signal for loading the eight bit data portion of the data signal into the selected register. The data direction register 209 selects those interface signals 217 which are to be output signals and enables the peripheral interface circuitry 213 to apply the binary states stored in the peripheral output register 211 to the interface signals 217. For the waveforms shown in FIG. 4, the transmitted address and control portion 01011010 has a binary zero for the register select and read/write bit, causing the data portion 00001111 to be loaded into the data direction register 209. Binary one bits of the data direction register cause corresponding interface signals 217 to be output signals, while binary zero bits cause corresponding interface signals 217 to be input signals. If the interface adapter 200 has received its address (101 for the waveform in FIG. 4), the chip select signal from control and decoding logic 207 enables transmission gate 221 for applying the sampled interface signals stored in transmitting register 219 to the return data signal line. The sampled interface signals are shifted out of the transmitting register 219 in response to the recovered clock signal from clock and data recovery circuitry 201.

Although five bits are designated as the address portion of the data signal, two of the bits are fixed and the other three bits are variable, being compared to three address straps by the control and decoding logic 207 to determine if the interface adapter 200 has been selected. For receiving the waveform in FIG. 4, the address straps must have binary states 101. Using only three of the address bits allows for uniquely addressing eight different interface adapters. By interchanging the connections of the true data and complement data signal lines to the clock and data recovery circuitry 201, an additional eight interface adapters can be uniquely addressed. For addressing each of these additional eight interface adapters, the two fixed address bits, bits 5 and 6 are complemented so that the chip select signal is properly decoded by the control and decoding logic 207.

Figure 3A:
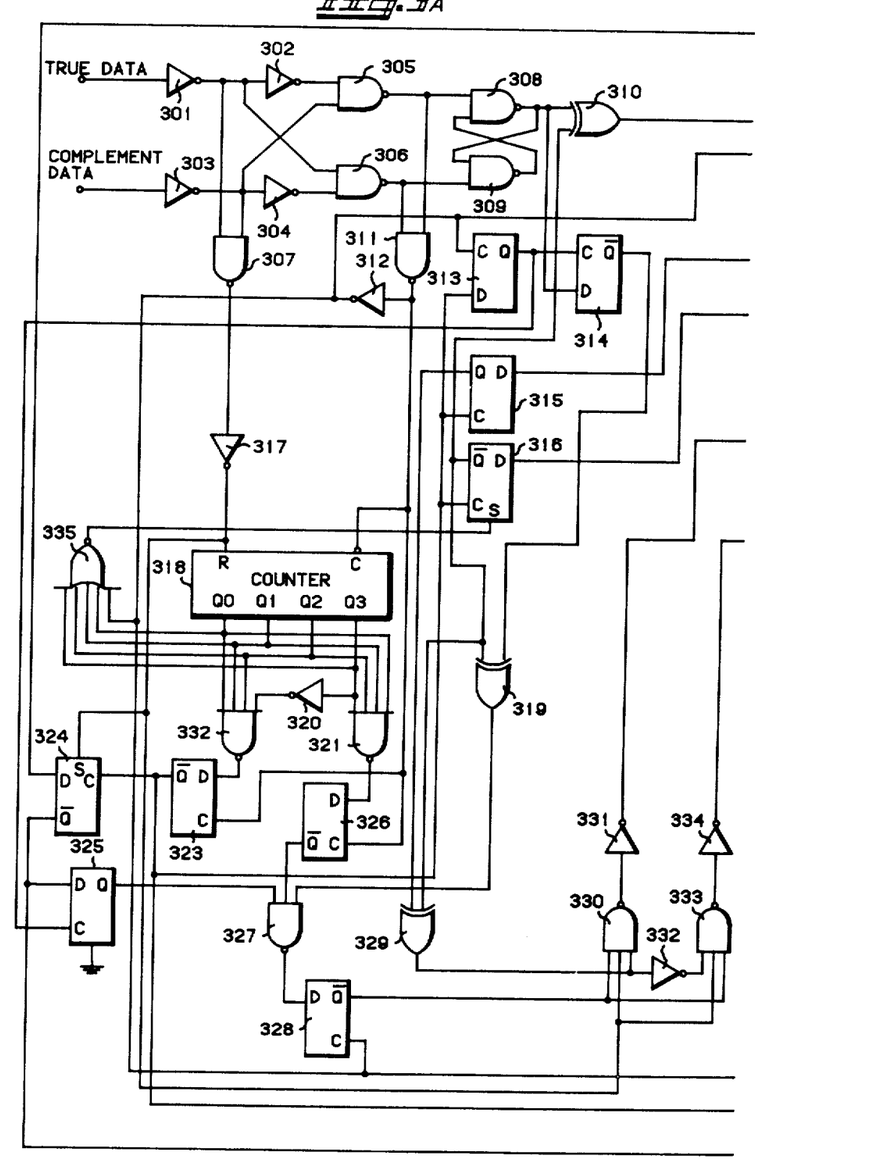
FIG. 3, including FIGS. 3A and 3B arranged together, is a detailed circuit diagram of the interface adapter in FIG. 2.
Figure 3B:
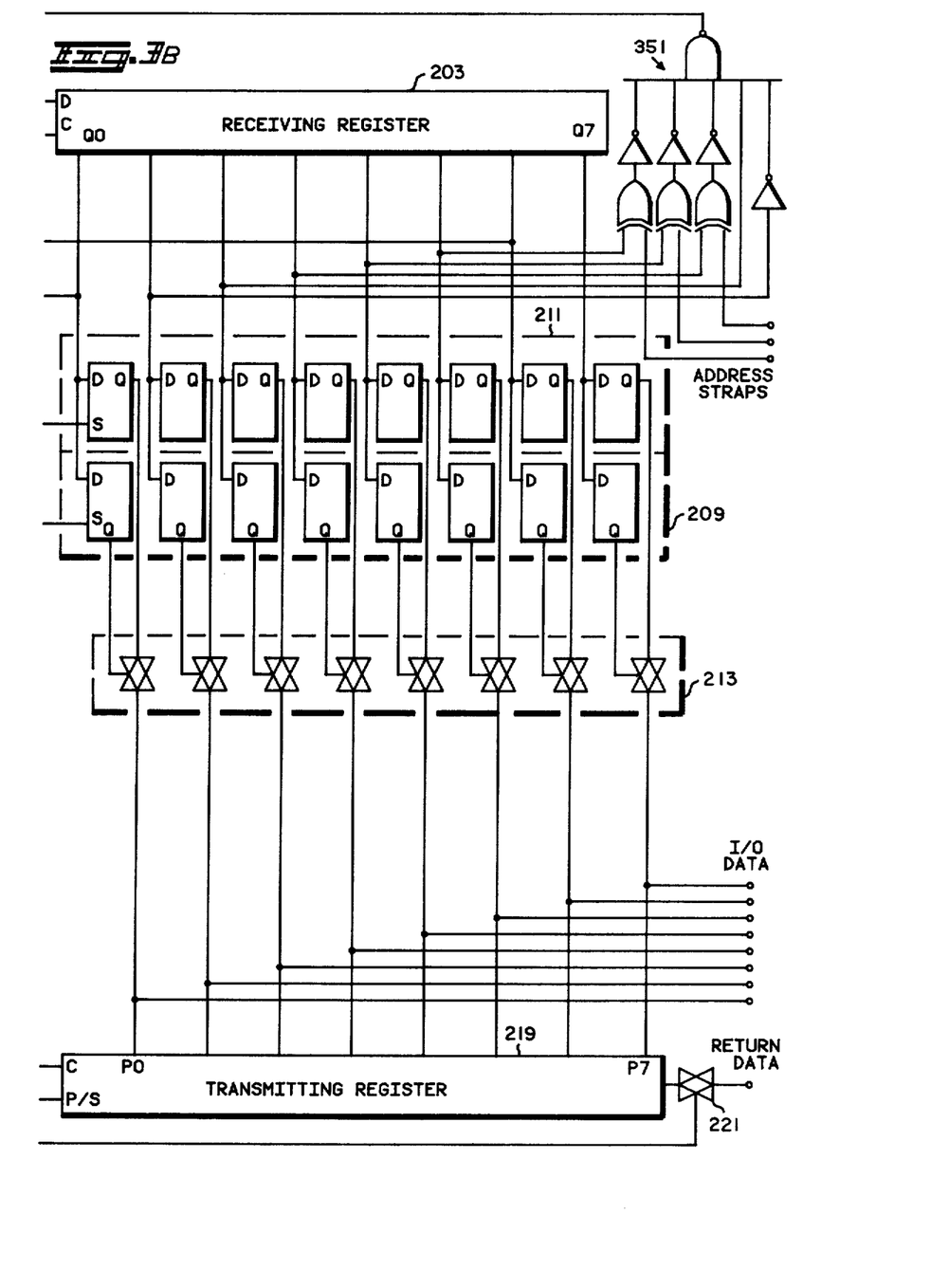

Referring to FIGS. 3A and 3B, there is illustrated a detailed circuit diagram of the interface adapter in FIG. 2. The true data and complement data signal lines are coupled via inverting gates 301, 302 and 303, 304 to NAND gate 305 for decoding the one state, NAND gate 306 for decoding the zero state and NAND gate 307 for decoding the word state. The decoded word state from NAND gate 307 provides a framing signal defining the beginning and end of each data signal. The decoded word state from NAND gate 307 is coupled via inverting gate 317 to reset counter 318 and to enable NAND gates 330 and 333 when data signals are not being received.

The decoded one state of the true data and complement data signal lines is coupled from NAND gate 305 to NRZ data latch 308, 309 and sets the NRZ data latch 308, 309 to provide a binary one state at the output of NAND gate 308 for binary one bits of the received data signal. The decoded zero state from NAND gate 306 is coupled to data latch 308, 309 for resetting the NRZ data latch 308, 309 to provide a binary zero state at the output of NAND gate 308 for binary zero bits of the recovered data signal. The output of data latch 308, 309 is coupled by exclusive OR gate 310 to the D input of receiving register 350. Exclusive OR gate 310 complements the NRZ data signal from data latch 308, 309 in response to the bus sense signal from flip-flop 316, which has a binary one state when the true data and complement data lines have been interchanged.

The decoded one state and zero states from NAND gates 305 and 306 are combined by NAND gate 311 to provide a recovered clock signal which is coupled to the clock inputs of counter 318 and flip-flops 323 and 326. The clock signal from NAND gate 311 is inverted and applied via inverting gate 312 to NOR gate 335, receiving register 203, transmitting register 219 and flip-flop 328. In other embodiments, a clock signal may also be provided by decoding the bit state transmitted between successive bits of the data signal.

Figure 4:
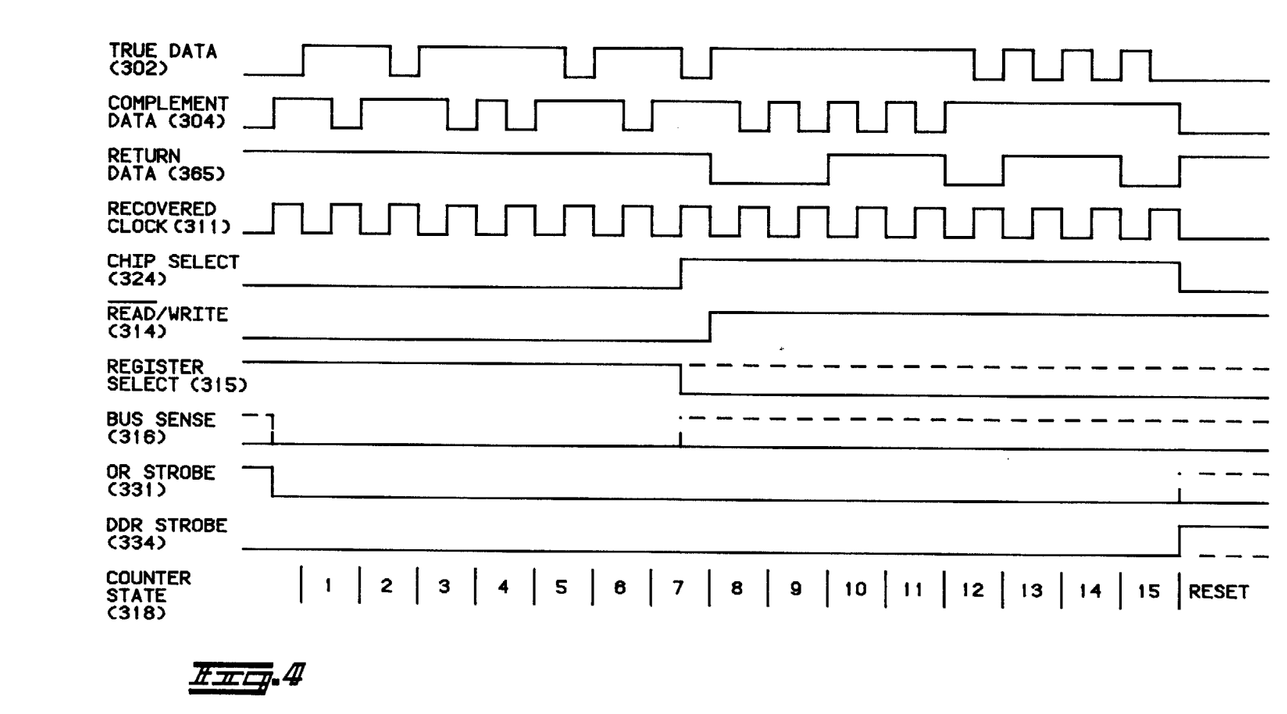
FIG. 4 is a timing diagram showing the signal waveforms for selected circuit elements of the interface adapter in FIG. 3.

For each zero and one state of the true data and complement data signal lines, counter 318 is advanced from one state to the next, as illustrated by the waveforms in FIG. 4. When counter 318 reaches state seven, which is decoded by NAND gate 322, seven bits of the address and control portion of the data signal have been loaded into receiving register 203 and the eighth bit is in data latch 308, 309. Next, flip-flop 323 provides an output pulse which clocks the chip select flip-flop 324, the register select flip-flop 315 and the bus sense flip-flop 316, which are loaded in accordance with the corresponding received bits of the data signal in the receiving register 203. The address bits in the receiving register 203 are compared with the address straps by gating circuitry 351, and if the address of the interface adapter is correctly decoded, NAND gate 351 provides a binary zero state, which is loaded into chip select flip-flop 324 resulting in a binary one state at its output. The binary one state from chip select flip-flop 324 enables transmission gate 221 for applying the sampled interface signals stored in the transmitting register 219 to the return data signal line.

Next, flip-flop 313 is loaded with the pulse from flip-flop 323 in response to the clock signal from inverting gate 312 and is utilized to clock the read/write flip-flop 314 and flip-flop 325. The binary state of the read/write signal, which is in data latch 308, 309 during state seven of counter 318, is loaded into flip-flop 314 and complemented, such that, if the output register 211 or the data direction register 209 is to be loaded, flip-flop 314 provides a binary one state at its output. Flip-flop 325 is loaded with the chip select signal from flip-flop 324 and applied via NAND gate 327 to write enable flip-flop 328.

The output pulse from flip-flop 323 also causes the transmitting register 219 to be parallel loaded with the interface signals during state seven of counter 318. Then, if the interface adapter has been properly addressed, the sampled interface signals are shifted out of the transmitting register 219 and applied to the return data signal line via transmission gate 221.

Once the interface adapter has been properly addressed and the binary states of the control signals in the received data signal have been stored in corresponding flip-flops, the following eight bit data portion of the received data signal is loaded into the receiving register 203 and applied as dictated by the stored control signals. If the bus sense control signal from flip-flop 316 is a binary zero, indicating that the true data and complement data signal lines have been interchanged, the bus sense flip-flop provides a binary one output signal, which is coupled to exclusive OR gate 310 for complementing the bits of the data portion of the data signal, to exclusive OR gate 319 for complementing the read/write signal from flip-flop 314 and to exclusive OR gate 329 for complementing the register select signal from flip-flop 315. All of these signals must be complemented since the bits of the data signal are complemented when the true data and complement data signal lines are interchanged, as described hereinabove.

Next, state fifteen of counter 318 is decoded by NAND gate 321 and coupled to flip-flop 326 which provides a binary one output signal at the next positive transition of the clock signal 311. The binary one output from flip-flop 326 together with the chip select signal from flip-flop 325 and the read/write signal from exclusive OR gate 319 are applied to NAND gate 327 causing write enable flip-flop 328 to provide a binary one output to load either the output register 211 or data direction register 209 with the data portion of the data signal in receiving register 203. NAND gates 330 and 333 combine the write enable signal from flip-flop 328, the register select signal from exclusive OR gate 329 and the detected word state of the true data and complement data signal lines from inverting gate 317 to provide corresponding strobe signals to the output register 211 and data direction register 209, respectively. The strobe signals 331 and 334 are held in the binary zero state by the detected word state 307, 317 while the data signal is being clocked into receiving register 203. When the strobe signals 331 and 334 have a binary zero state, each of the registers 211 and 360 is in the latched state. The strobe signals 331 and 334 change to a binary one state depending on which register 211 or 209 has been selected and is to be written into. When one of the strobe signals 331 and 334 has a binary one state, the corresponding register 211 or 209 is transparent, transferring the data portion of the received data signal from receiving register 203 to the output of the strobed register. When both the output register 211 and data direction register 209 have been loaded, the binary states stored in output register 211 are applied to the interface signals by transmission gates 213, which are enabled to be transparent by those stages of the data direction register 209 loaded with a binary one state. If it is desired to prevent the application of erroneous output signals at power turn-on, a momentary reset signal may be applied to the data direction register 209 for resetting all stages to the binary zero state to insure that all interface signals are initially treated as input signals.

Referring to FIG. 4, there is illustrated waveforms for the signals of referenced circuit elements in FIG. 3 for a sixteen-bit data signal having a 01011010 address and control portion and a 00001111 data portion. The address and control portion 01011010 indicates that the data direction register 209 in FIG. 3B is to be loaded with data portion 00001111, programming one-half of the interface signals as inputs and the other half as outputs. While the data portion is being shifted into receiving register 203, transmitting register 219, loaded with 00110110, is serially shifted and coupled via transmission gate 221 to the return data signal line.

The interface adapter in FIGS. 3A and 3B can be constructed of conventional integrated circuit devices, such as the CMOS devices described in the CMOS Integrated Circuits Book, published by Motorola Semiconductor Products, Inc., Austin, Tex., 1978. Furthermore, the electrical circuit devices comprising the interface adapter in FIGS. 3A and 3B can be readily integrated into a semiconductive substrate, such as CMOS, and provided in a single integrated circuit device.

In summary, a unique interface adapter has been described which programmably accommodates a number of interface signals as either input or output signals. The interface adapter may be selectively addressed by data signals received from a unique self-clocking serial data bus. The self-clocking serial data bus includes true data and complement data signal lines for transmitting data signals to a selected interface adapter and a return data signal line for receiving data signals from the selected interface adapter. The data transmission on the self-clocking serial data bus is highly immune to both speed and timing variations. As a result, the interface adapter can be situated in remote locations and can be mechanized without utilizing expensive and complex timing circuitry. The inventive interface adapter may be advantageously utilized in any application where it is required to minimize the number of interconnections between a control unit and a plurality of interface signals while providing reliable bidirectional data communications therebetween.

We claim:

1. Interface adapter circuitry coupled to a self-clocking serial data bus having binary first and second forward data signals for receiving a binary data signal including data, address and control portions, transmitted thereon, the first and second forward data signals having a first binary state before and after the data signal, the first forward data signal having a second binary state and the second forward data signal having the first binary state for data signal bits having a binary zero state, the first forward data signal having the first binary state and the second forward data signal having the second binary state for data signal bits having a binary one state, and the first and second forward data signals having the second binary state between successive data signal bits, said interface circuitry comprising:

generating means responsive to the second binary state of the first and second forward data signals for generating a clock signal;

latch means coupled to the first and second forward data signals for storing an output signal having a binary zero state in response to the second binary state of the first forward data signal and the first binary state of the second forward data signal, and storing an output signal having a binary one state in response to the first binary state of the first forward data signal and the second binary state of the second forward data signal;

receiving register means having a plurality of output signals and being responsive to the clock signal for serially receiving the latch means output signal;

output register means having a plurality of output signals and being responsive to a first control signal for receiving the data portion of the data signal in the receiving register means;

data direction register means having a plurality of output signals and being responsive to a second control signal for receiving the data portion of the data signal in the receiving means;

interface means, having a plurality of interface signals, for applying each of the output register means output signals to a corresponding interface signal in response to a predetermined binary state of a corresponding data direction register means output signal;

detecting means responsive to the adddress portion of the data signal in the receiving register means for detecting the presence of a predetermined address signal and generating a chip select signal when the predetermined address signal is detected; and control means responsive to the chip select signal and the control signal portion of the data signal in the receiving register means for generating the first and second control signals.

2. The interface adapter circuitry according to claim 1, wherein said serial data bus further includes a return data signal, said interface adapter circuitry being coupled to the return data signal and further including transmitting means enabled by the chip select signal to apply successive ones of the interface signals to the return data signal in response to the clock signal.

3. The interface adapter circuitry according to claim 2, wherein said transmitting means further includes transmitting register means for storing the interface signals, said transmitting register means responsive to the clock signal for storing the interface signals when the chip select signal is absent and shifting out the stored interface signals for application to the return data signal when the chip select signal is present.

4. The interface adapter circuitry according to claim 1, wherein said detecting means is further coupled to a plurality of address signal lines for determining the predetermined address signal.

5. The interface adapter circuitry according to claim 1, wherein said interface circuitry further includes complementing means responsive to a third control signal for logically complementing the latch means output signal received by the receiving register means, said control means being responsive to the control portion of the data signal in the receiving register means for providing the third control signal.

6. The interface adapter circuitry according to claims 1 or 5, wherein said control means is disabled from providing said control signals in response to detection of the first binary state of the first and second forward data signals.

7. The interface adapter circuitry according to claim 1, further including substrate means, said interface adapter circuitry formed of electrical circuit components integrated into the substrate means.

8. The interface adapter circuitry according to claim 5, wherein said complementing means further includes means responsive to the third control signal for complementing the first and second control signals.

* * * * *

UNITED STATES PATENT AND TRADEMARK OFFICE
CERTIFICATE OF CORRECTION

PATENT NO. : 4,390,963

DATED : 6/28/83

INVENTOR(S) : Larry C. Puhl et al

It is certified that error appears in the above—identified patent and that said Letters Patent is hereby corrected as shown below:

(Claim 1)
Column 10, Line 62 - Delete "receiving means" and insert

"receiving register means"

Signed and Sealed this

Twenty-second Day of November 1983

[SEAL]

Attest:

GERALD J. MOSSINGHOFF

Attesting Officer　　Commissioner of Patents and Trademarks